United States Patent
Sakurai

(10) Patent No.: US 7,095,191 B2
(45) Date of Patent: Aug. 22, 2006

(54) CONTROL APPARATUS OF ELECTRIC VEHICLE

(75) Inventor: Tomohiro Sakurai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/139,547

(22) Filed: May 31, 2005

(65) Prior Publication Data

US 2005/0269981 A1 Dec. 8, 2005

(30) Foreign Application Priority Data

Jun. 7, 2004 (JP) .............................. 2004-168819

(51) Int. Cl.
*H02P 8/28* (2006.01)

(52) U.S. Cl. ...................................... 318/139

(58) Field of Classification Search .................... None
See application file for complete search history.

(56) References Cited

U.S. PATENT DOCUMENTS

| | | | | |
|---|---|---|---|---|
| 3,845,368 A * | 10/1974 | Elco | ............................ | 318/139 |
| 4,560,937 A * | 12/1985 | Finger | ......................... | 324/433 |
| 4,713,716 A * | 12/1987 | Takemura et al. | .............. | 361/2 |
| 4,962,462 A * | 10/1990 | Fekete | ......................... | 700/297 |
| 5,828,192 A * | 10/1998 | Kawaguchi et al. | ......... | 318/139 |
| 5,877,601 A * | 3/1999 | Obara et al. | ................. | 318/139 |
| 5,982,154 A * | 11/1999 | Kanazawa et al. | ............ | 322/29 |
| 6,020,696 A * | 2/2000 | Matsunaga et al. | .......... | 318/139 |
| 6,037,749 A * | 3/2000 | Parsonage | .................... | 320/132 |
| 6,137,193 A * | 10/2000 | Kikuoka et al. | ............. | 307/137 |
| 6,223,852 B1 * | 5/2001 | Mukai et al. | ................ | 180/446 |
| 6,252,363 B1 * | 6/2001 | Grady | ......................... | 318/266 |
| 6,320,351 B1 * | 11/2001 | Ng et al. | ..................... | 320/104 |
| 6,329,772 B1 * | 12/2001 | Ochiai et al. | ................ | 318/139 |
| 6,390,229 B1 * | 5/2002 | Kaji | ............................ | 180/443 |
| 6,476,571 B1 * | 11/2002 | Sasaki | ......................... | 318/139 |
| 6,488,107 B1 * | 12/2002 | Ochiai et al. | .............. | 180/65.2 |
| 6,497,303 B1 * | 12/2002 | Nishimura et al. | .......... | 180/446 |
| 6,586,899 B1 * | 7/2003 | Joch | ............................ | 318/434 |
| 6,657,833 B1 * | 12/2003 | Matsuki et al. | ................ | 361/23 |

(Continued)

FOREIGN PATENT DOCUMENTS

JP 10-144194 5/1998

*Primary Examiner*—Lincoln Donovan
*Assistant Examiner*—Robert W. Horn
(74) *Attorney, Agent, or Firm*—Smith, Gambrell & Russell, LLP

(57) ABSTRACT

A control apparatus of an electric vehicle in which relays are switched to a disconnecting state without causing failure of the electric vehicle. Main relays Ry1, Ry2 switchable between a connecting state and a disconnecting state are provided between a drive motor 11 for driving driven wheels and a motor drive battery 34 for supplying current to the drive motor 11. When these main relays Ry1, Ry2 are to be switched to the disconnecting state, it is determined whether or not the output current I from the motor drive battery 34 is below a predetermined current and whether or not the vehicle speed V is below a predetermined speed. When it is determined that the output current I is below the predetermined current and the vehicle speed V is below the predetermined speed, the main relays Ry1, Ry2 are switched to their disconnecting states. By this means it is possible to prevent welding failure of the main relays Ry1, Ry2 and to protect an invertor 36 and high-voltage auxiliaries 58 from an induced voltage of the drive motor 11.

10 Claims, 4 Drawing Sheets

U.S. PATENT DOCUMENTS

| | | | |
|---|---|---|---|
| 6,747,457 B1 * | 6/2004 | Suzuki | 324/433 |
| 6,784,563 B1 * | 8/2004 | Nada | 290/40 C |
| 6,794,836 B1 * | 9/2004 | Strothmann et al. | 318/268 |
| 6,815,100 B1 * | 11/2004 | Aoyagi et al. | 429/13 |
| 6,828,798 B1 * | 12/2004 | Morimoto | 324/527 |
| 6,850,042 B1 * | 2/2005 | Kouwa | 322/24 |
| 6,923,279 B1 * | 8/2005 | Shimane et al. | 180/65.1 |
| 6,969,337 B1 * | 11/2005 | Kadota et al. | 477/5 |
| 2005/0269981 A1 * | 12/2005 | Sakurai | 318/139 |

* cited by examiner

CONTROL APPARATUS OF ELECTRIC VEHICLE

CROSS REFERENCE TO RELATED APPLICATIONS

The disclosure of Japanese Application No. 2004-168819 filed on Jun. 7, 2004 including the specification, drawing and abstract is incorporated herein by reference in its entirety.

BACKGROUND OF THE INVENTION

This invention relates to a control apparatus of an electric vehicle having a relay between a battery and an electric motor.

In recent years, many electric vehicles in which driven wheels are driven using an electric motor have been developed. This kind of electric vehicle includes electric cars having only an electric motor as a motive power source and hybrid cars having an electric motor and an engine as motive power sources.

A drive circuit such as an invertor for producing a driving current for the electric motor is provided between the battery and the electric motor in this kind of electric vehicle, and a relay for supplying or cutting off current to/from the drive circuit is provided between the drive circuit and the battery. The relay for controlling the supply of current to the drive circuit is switched in correspondence with the state of an ignition switch (hereinafter abbreviated to switch), and when the switch is turned ON by a driver the relay is switched to a connecting state and current is supplied to the drive circuit through the relay, and when the switch is turned OFF by the driver the relay is switched to a disconnecting state and current to the drive circuit through the relay is cut off.

In electric vehicles of recent years, to increase the motive power of the vehicle, the electrical power supplied to the electric motor has been tending to increase. Consequently, a large current has also been supplied to the relay, and when inadvertently the switch is turned OFF and the relay is switched to its disconnecting state, there has been a risk of a spark being produced across the contacts of the relay and of welding failure of the relay contacts occurring.

When this kind of welding failure occurs in the relay, because the output current from the battery cannot be cut off, it becomes difficult to ensure the safety of the vehicle. To overcome this, electric vehicles have been developed (see for example JP-A-10-144194) in which, when a disconnection signal has been outputted to the relay, by the voltage of a power supply circuit being measured, a diagnosis is made of whether or not the relay has disconnected normally, that is, whether or not there has been a welding failure. In this electric vehicle, when a welding failure of the relay has been detected, safety of the vehicle is ensured by travel prohibition processing, charge prohibition processing and alarm processing being carried out.

However, even if after a welding failure of the relay contacts is diagnosed safety of the vehicle is secured by these processes being carried out, because as a result of the welding failure the vehicle becomes unable to travel, a control apparatus capable of preventing welding failure before it occurs has been needed. And from the point of view of repair cost also, it is desirable for welding failure of the relay contacts to be prevented before it occurs.

Also, even if welding failure of the relay contacts does not occur, whenever the relay is switched to its disconnecting state by the switch being inadvertently turned OFF, there is a risk of the drive circuit being destroyed. That is, in a vehicle using a permanent magnet type motor, because an induced voltage arises along with rotation of the motor, when the relay is disconnected while the electric motor is rotating and the battery is thus cut off from the electric motor, there is a risk of the induced voltage from the electric motor being applied locally.

SUMMARY OF THE INVENTION

It is therefore an object of the present invention to provide a control apparatus of an electric vehicle in which a relay is switched to a disconnecting state without causing any failure of the electric vehicle.

To achieve this object and other objects, the invention provides a control apparatus of an electric vehicle having an electric motor for driving driven wheels and a battery for supplying current to the electric motor, wherein it includes a relay provided between the electric motor and the battery and switchable between a connecting state in which it supplies current to the electric motor and a disconnecting state in which it cuts off the supply, relay control means for outputting a control signal to the relay and switching the relay between the connecting state and the disconnecting state, and current detecting means for detecting the output current from the battery, and the relay control means switches the relay to the disconnecting state when the output current from the battery is below a predetermined value.

The invention also provides a control apparatus of an electric vehicle having an electric motor for driving driven wheels and a battery for supplying current to the electric motor, wherein it includes a relay provided between the electric motor and the battery and switchable between a connecting state in which it supplies current to the electric motor and a disconnecting state in which it cuts off the supply, relay control means for outputting a control signal to the relay and switching the relay between the connecting state and the disconnecting state, and electromotive force detecting means for detecting an induced electromotive force from the electric motor, and the relay control means switches the relay to the disconnecting state when the induced electromotive force from the electric motor is below a predetermined value.

In a control apparatus of an electric vehicle according to the invention, preferably, the electromotive force detecting means detects the induced electromotive force on the basis of the motor revolution number speed or the vehicle speed.

And in a control apparatus of an electric vehicle, preferably, a drive circuit for producing a driving current for the electric motor is provided between the electric motor and the relay.

With this invention, because the relay is only switched to its disconnecting state when the output current of the battery is below a predetermined value, welding failure of the relay contacts can be prevented.

And with this invention, because the relay is only switched to its disconnecting state when the induced electromotive force from the electric motor is below a predetermined value, the control apparatus is protected from induced electromotive force. That is, because the battery is cut off from the electric motor when the induced electromotive force has fallen, an excessive induced electromotive force does not act locally, and damage of the control apparatus caused by induced electromotive force can be avoided.

DESCRIPTION OF THE PREFERRED EMBODIMENTS

Figure 1:
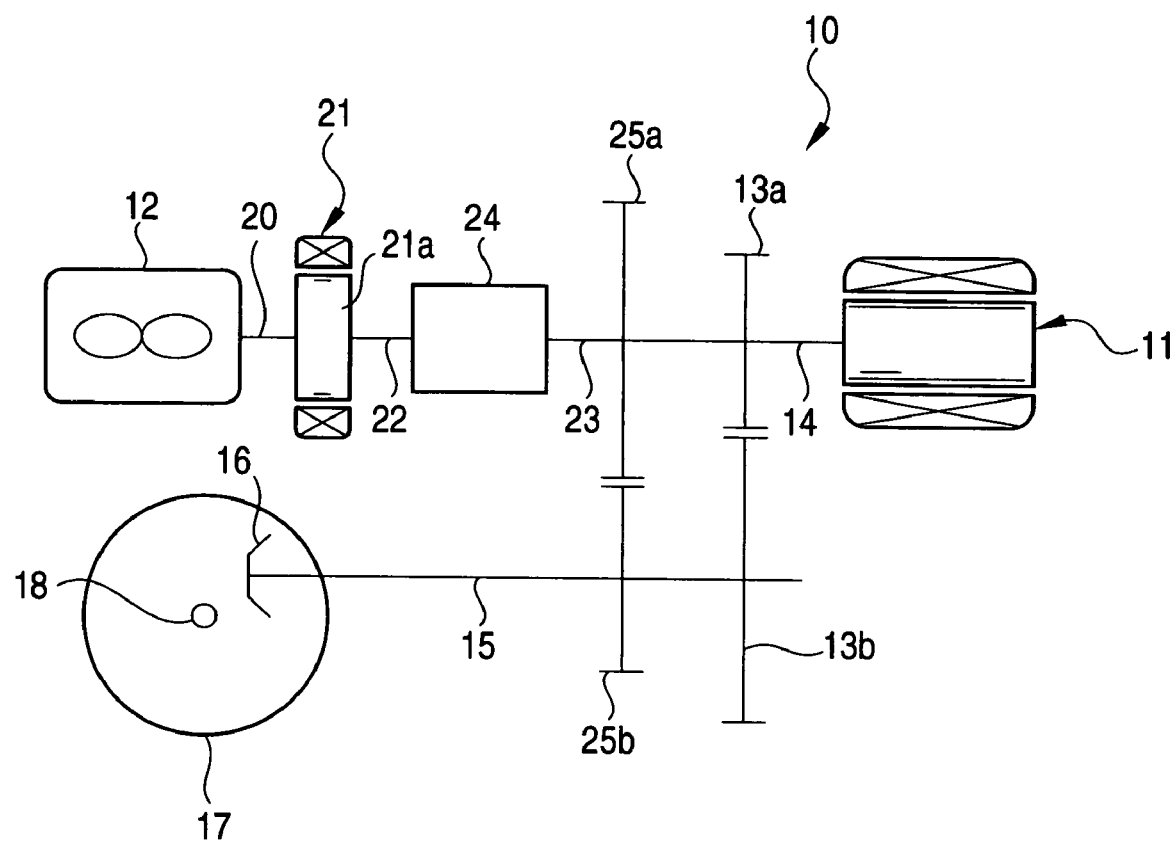
FIG. 1 is a schematic view showing a drive unit controlled by a preferred embodiment of a control apparatus of an electric vehicle according to the invention.

A preferred embodiment of the invention will now be described on the basis of the drawings. FIG. 1 is a schematic view showing a drive unit 10 controlled by a control apparatus constituting one embodiment of the invention. The drive unit 10 shown in FIG. 1 is a drive unit of a front-wheel-drive hybrid automobile (electric vehicle), and has as motive power sources an electric drive motor 11 and an internal combustion engine 12. The drive motor 11 has a motor output shaft 14 to which is fixed a motor-side drive gear 13a, and fixed to a front wheel drive shaft 15 parallel to this is a motor-side following gear 13b meshing with the motor-side drive gear 13a. A final reduction gear 16 is fixed to a distal end of the front wheel drive shaft 15, and a differential mechanism (not shown) is assembled to a final reduction large gear 17 meshing with this final reduction gear 16. An axle 18 extending in the vehicle width direction from this differential mechanism is connected to front wheels, which are driven wheels, and motor power transmitted from the drive motor 11 through the front wheel drive shaft 15 is transmitted through the differential mechanism to the left and right front wheels.

A generator 21 is connected to the crankshaft 20 of the engine 12, and a rotor output shaft 22 is fixed to the rotor 21a of the generator 21. A coupling 24 actuatable to an engaged state of transmitting the engine power and a disengaged state of cutting off the engine power is provided between the rotor output shaft 22 and an engine output shaft 23, which are disposed coaxially, and an engine-side drive gear 25a meshing with an engine-side following gear 25b on the front wheel drive shaft 15 is fixed to the engine output shaft 23, to which power is transmitted through the coupling 24. As the coupling 24, a meshing-type two-way clutch or a friction clutch is used.

The generator 21 connected to the crankshaft 20 of the engine 12 has not only the function of generating electricity from engine power but also the function of an electric motor, and by the generator 21 being driven as an electric motor the engine 12 can be started. And, the drive motor 11 has the function of a generator, and by the drive motor 11 being operated as a generator during braking of the vehicle, kinetic energy can be converted to electrical energy and recovered.

A hybrid car having this drive unit 10 has a series drive mode, in which the driven wheels are driven by motor power, and a parallel drive mode, in which the driven wheels are driven by both motor power and engine power. At low to medium speeds, when driving torque is required, the series drive mode is used, and at high speeds and during acceleration, when the load is high, the parallel drive mode is used. Optionally, an engine drive mode, in which the driven wheels are driven using engine power only, may be provided, in addition to the series drive mode and the parallel drive mode.

Figure 2:
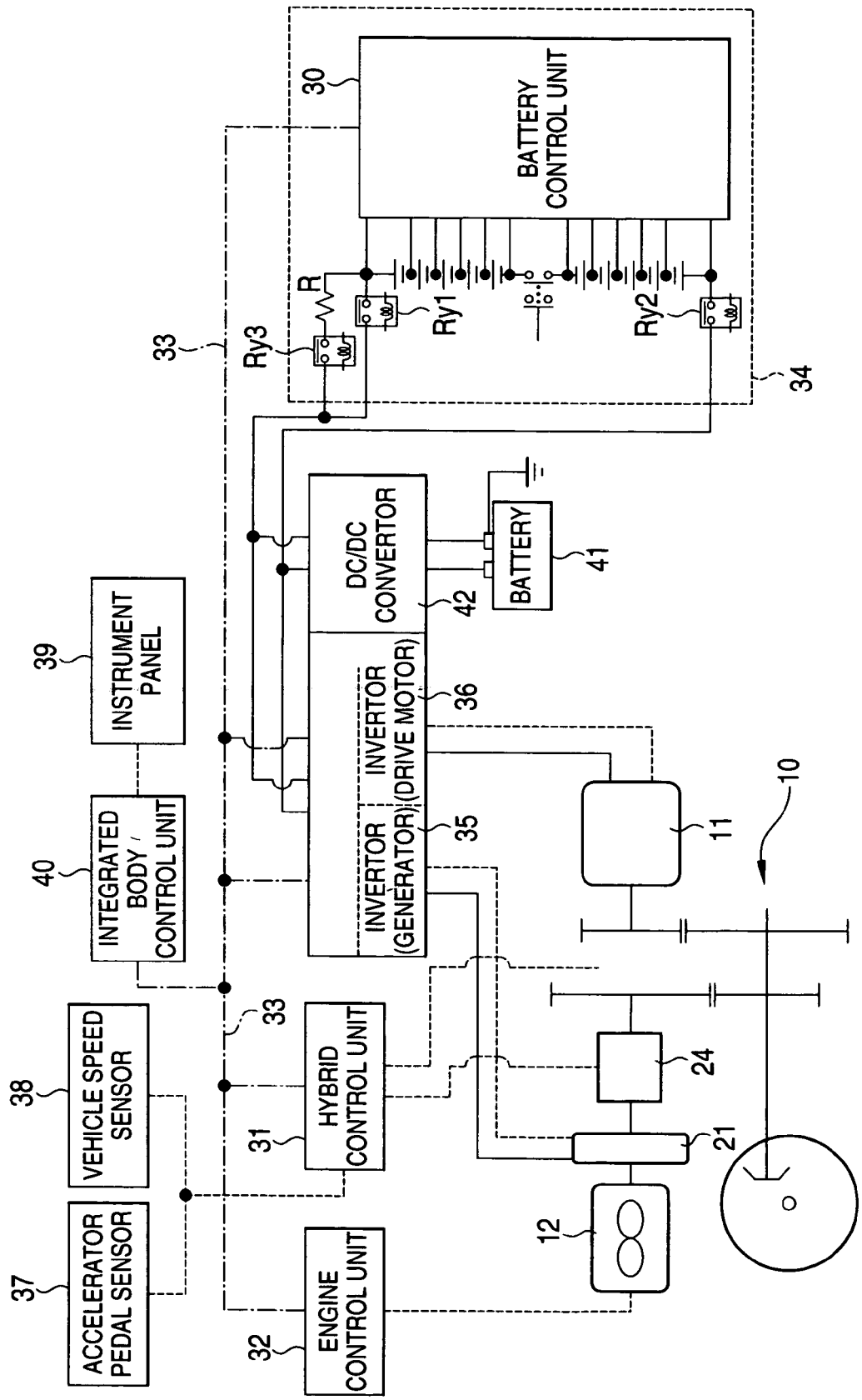
FIG. 2 is a block diagram showing a control apparatus of a hybrid automobile.

FIG. 2 is a block diagram showing the hybrid car control apparatus. As shown in FIG. 2, the hybrid car has various kinds of control units 30 to 32, and the drive state of the hybrid car is controlled on the basis of control signals outputted from these control units 30 to 32. The control units 30 to 32 are connected to each other by communication cables, and a communication network 33 for communicating control signals and the like among these control units is constructed in the hybrid car. Each of the control units 30 to 32 has a CPU for processing control signals, ROM for storing computation formulas and map data and the like, and RAM for storing data temporarily.

As shown in FIG. 2, the hybrid car has a motor drive battery 34 for storing energy generated by the generator 21 and supplying electrical power to the drive motor 11. A battery control unit 30 serving as current detecting means is connected to this motor drive battery 34, and an output current of the motor drive battery 34 is detected by this battery control unit 30. The battery control unit 30 also detects the voltage and cell temperature of the motor drive battery 34, and calculates a state of charge (SOC) of the motor drive battery 34 on the basis of this voltage, current and cell temperature. Alternatively, a capacitor may be used instead of the motor drive battery 34.

An invertor 35 constituting a generator drive circuit is provided between the motor drive battery 34 and the generator 21, and an a.c. current generated by the generator 21, which is a permanent magnet type synchronous motor, is converted into a d.c. current by the invertor 35 and then used to charge the motor drive battery 34. When the generator 21 is driven as an electric motor, a d.c. current from the motor drive battery 34 is converted into an a.c. current by the invertor 35 and supplied to the generator 21.

Similarly, an invertor 36 constituting a drive circuit of the driving motor is provided between the motor drive battery 34 and the drive motor 11, and a d.c. current from the motor drive battery 34 is converted into an a.c. current by the invertor 36 and supplied to the drive motor 11, which is a permanent magnet type synchronous motor. An a.c. current generated by regenerative braking, that is, an a.c. current generated by the drive motor 11 during braking of the vehicle, is converted into a d.c. current by the invertor 36 and used to charge the motor drive battery 34.

An accelerator angle from an accelerator pedal sensor 37 and a vehicle speed V from a vehicle speed sensor 38 are inputted to a hybrid control unit 31 for controlling the drive unit 10, and various drive information of the engine 12, the drive motor 11 and the generator 21 and the charge state, current and voltage of the motor drive battery 34 are also inputted to the hybrid control unit 31 via the communication network 33. On the basis of the various inputted signals, the hybrid control unit 31 controls the drive state of the drive unit 10 by outputting control signals to the coupling 24, an engine control unit 32 and the invertors 35, 36. The engine control unit 32 controls the drive state of the engine 12 by drive-controlling a throttle valve, injectors and ignitors on the basis of a control signal from the hybrid control unit 3i.

The drive condition of the hybrid car controlled by these control units 30 to 32 is displayed on an instrument panel 39 provided in a passenger compartment so that a driver can be aware of the drive condition. An integrated body control unit 40 is connected to the communication network 33 mentioned above, and the drive states of the engine 12, the drive motor 11 and the generator 21, and the charge state of the motor drive battery 34, are outputted to the instrument panel 39 via the overall body control unit 40.

The hybrid car is provided with an auxiliary battery 41 having a lower voltage than the motor drive battery 34 (for example 12V), for supplying current to electrical equipment such as auxiliaries. To charge this auxiliary battery 41, a DC/DC-convertor 42 is provided between the auxiliary battery 41 and the motor drive battery 34, and a high-voltage current generated for the motor drive battery 34 is converted into a low-voltage current for the auxiliary battery 41 by the DC/DC-convertor 42.

Figure 3:
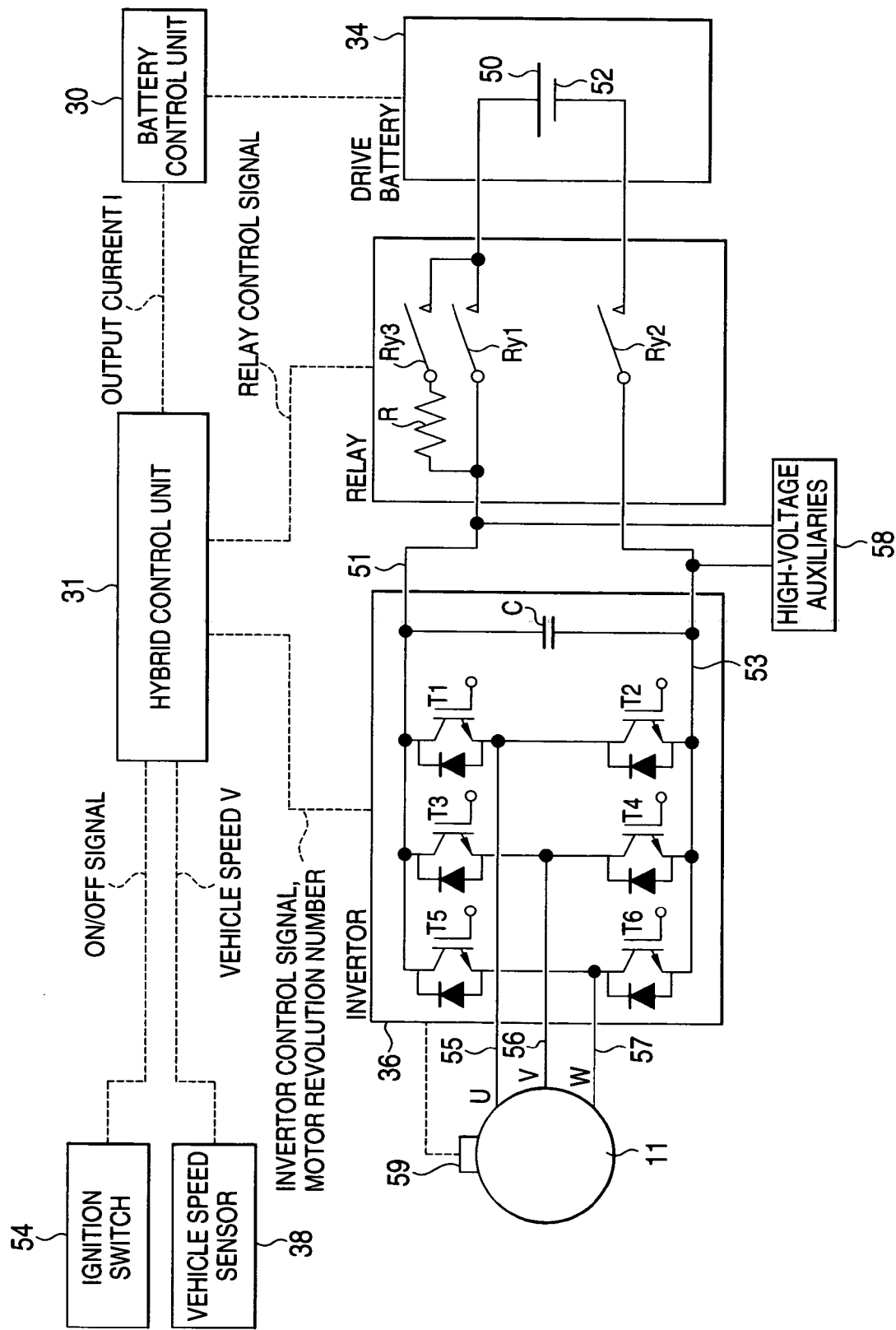
FIG. 3 is a block diagram showing a power supply path to a driving motor.

Next, control of the supply of power to the drive motor 11 will be explained. FIG. 3 is a block diagram showing the supply path of power to the drive motor 11. As shown in FIG. 3, a plus-side electrode 50 of the motor drive battery 34 is connected to a power line 51 of the invertor 36 by a main relay Ry1, and a minus-side electrode 52 of the motor drive battery 34 is connected to a power line 53 of the invertor 36 by a main relay Ry2. These main relays Ry1, Ry2 are switchable in correspondence with a control signal from the hybrid control unit 31, which is relay control means, between a connecting state and a disconnecting state, and when an ignition switch (hereinafter abbreviated to switch) 54 is turned ON by a driver, the main relays Ry1, Ry2 are each switched to their connecting state, and when the switch 54 is turned OFF by the driver, the main relays Ry1, Ry2 are switched to their disconnecting state via a disconnection control procedure that will be further discussed later.

The invertor 36, to which the output current from the motor drive battery 34 is supplied via these main relays Ry1, Ry2, is made up of a U-phase arm 55, a V-phase arm 56 and a W-phase arm 57 provided between the power lines 51, 53. The U-phase arm 55 has transistors T1, T2 connected in series, the V-phase arm 56 has transistors T3, T4 connected in series, and the W-phase arm 57 has transistors T5, T6 connected in series. Diodes are provided between the collectors and the emitters of the transistors T1 to T6.

The hybrid control unit 31 converts the d.c. current from the motor drive battery 34 into a three-phase driving current by performing switch-control (for example pulse width modulation control) of the transistors T1 to T6 in accordance with the drive condition, and supplies this three-phase current to the drive motor 11. And, a three-phase current generated by the drive motor 11 during regenerative braking is converted into a d.c. current by the invertor 36 and supplied to the motor drive battery 34. A smoothing condenser C is provided between the power lines 51, 53 of the invertor 36, and the d.c. currents flowing between the motor drive battery 34 and the invertor 36 are smoothed by the smoothing condenser C.

In the power line 51, an auxiliary relay Ry3 having a pre-charge resistance R is provided in parallel with the main relay Ry1. This auxiliary relay Ry3 is provided to protect the invertor 36 from excessive surge currents, and when the main relay Ry1 is to be switched to its connecting state, the auxiliary relay Ry3 is switched to its connecting state first so that the smoothing condenser C is charged. That is, because if the main relays Ry1, Ry2 are closed with the smoothing condenser C discharged an excessive surge current flows into the invertor 36, the smoothing condenser C is first charged via the auxiliary relay Ry3 before the main relay Ry1 is switched to its connecting state. Because the auxiliary relay Ry3 has the pre-charge resistance R, an excessive surge current does not flow into the invertor 36 even when the auxiliary relay Ry3 is connected.

Figure 4:
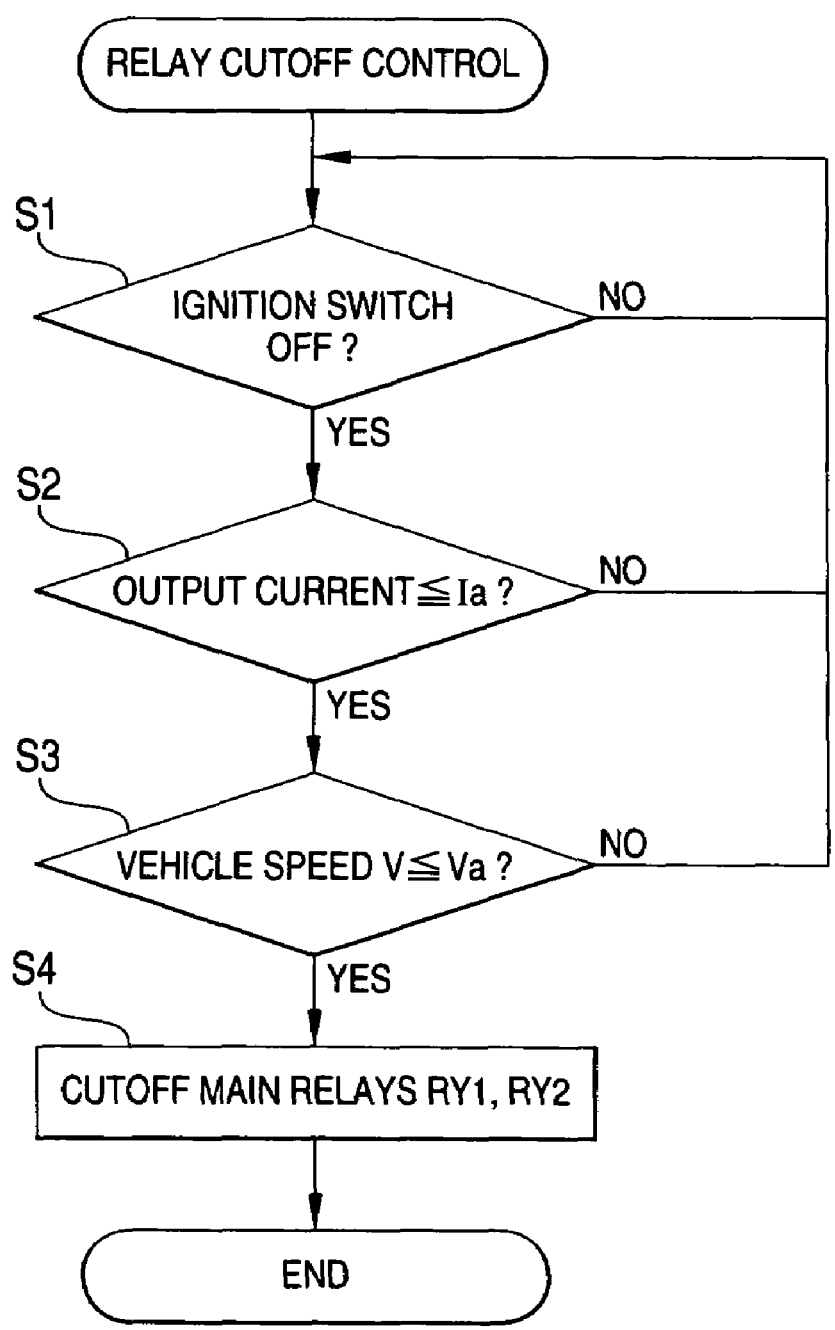
FIG. 4 is a flow chart showing a routine for switching main relays between a connecting state and a disconnecting state.

Next, disconnection control of the main relays Ry1, Ry2 executed by the hybrid control unit 31 will be described. FIG. 4 is a flow chart showing a procedure for switching the main relays Ry1, Ry2 from their connecting states to their disconnecting states. As shown in FIG. 4, first, in a step S1, it is determined whether or not the switch 54 has been turned OFF by the driver, that is, whether or not there has been a vehicle stop request from the driver. When in step S1 it is determined that the switch 54 is OFF, determinations of conditions for disconnection of the main relays Ry1, Ry2 are made in the following steps S2 and S3.

In step S2, it is determined whether or not the output current I from the motor drive battery 34 is below a predetermined current Ia constituting a predetermined value. When the output current I is above the predetermined current Ia, because there is a risk of an excessive surge voltage arising if the main relays Ry1, Ry2 are disconnected, the main relays Ry1, Ry2 are not switched to their disconnected states and the disconnection conditions are determined from step S1 again. The predetermined current Ia compared with the output current I in step S2 is a current value pre-set on the basis of experiment or simulation, and is a current value such that there is no welding failure of the relay contacts.

When on the other hand in step S2 it is determined that the output current I is below the predetermined current Ia, processing proceeds to step S3 and it is determined whether or not the vehicle speed V is above a predetermined vehicle speed Va constituting a predetermined value. When it is determined by the hybrid control unit 31, which is electromotive force detecting means, that the vehicle speed V is above the predetermined vehicle speed Va, then because the drive motor 11 is rotating at in excess of a predetermined speed and there is a risk of an induced electromotive force, i.e. induced voltage, from the drive motor 11 exceeding the withstandable voltages of the invertor 36 and high-voltage auxiliaries 58, the main relays Ry1, Ry2 are not switched to their disconnecting states and the disconnection conditions are determined from step S1 again. The predetermined vehicle speed Va compared with the vehicle speed V in step S3 is a vehicle speed pre-set on the basis of experiment or simulation, and is a speed such that an excessive induced voltage is not generated.

When on the other hand in step S3 it is determined that the vehicle speed V is below the predetermined vehicle speed Va, processing proceeds to step S4 and a disconnection signal is outputted from the hybrid control unit 31 to the main relays Ry1, Ry2 and the main relays Ry1, Ry2 switch to their disconnecting states. That is, when after the switch 54 has been turned OFF by the driver, the output current I has fallen below the predetermined current Ia and the vehicle speed V has fallen below the predetermined vehicle speed Va, the main relays Ry1, Ry2 are switched to their disconnecting states.

Thus, when the switch 54 has been turned OFF, because the main relays Ry1, Ry2 are not disconnected immediately and the main relays Ry1, Ry2 are kept in their connecting states until the output current I falls below the predetermined current Ia, welding failure of the main relays Ry1, Ry2 can be prevented. That is, because the main relays Ry1, Ry2 are switched to their disconnecting states only after the current flowing through the main relays Ry1, Ry2 has fallen, the surge voltage arising on disconnection can be kept down and welding failure of the main relays Ry1, Ry2 can be prevented.

And, when the switch 54 has been turned OFF, because the main relays Ry1, Ry2 are not disconnected immediately and the main relays Ry1, Ry2 are kept in their connecting states until the vehicle speed V falls below the predetermined vehicle speed Va, damage to the invertor 36 and the high-voltage auxiliaries 58 can be avoided. That is, when the main relays Ry1, Ry2 are disconnected, because the motor drive battery 34 is disconnected from the drive motor 11, an induced voltage from the drive motor 11 acts locally on the invertor 36 and the high-voltage auxiliaries 58 present between the drive motor 11 and the main relays Ry1, Ry2. Accordingly, by the main relays Ry1, Ry2 being disconnected only when the vehicle speed V has fallen below the predetermined vehicle speed Va, that is, when the induced voltage from the drive motor 11 has fallen, the induced voltage impressed on the invertor 36 and the high-voltage auxiliaries 58 can be lightened and it is possible to protect the invertor 36 and the high-voltage auxiliaries 58 from induced voltages.

Although here the hybrid control unit 31 is detecting the induced voltage from the drive motor 11 on the basis of the vehicle speed V, there is no limitation to this, and alternatively the induced voltage of the drive motor 11 may be detected directly on the basis of a motor revolution number outputted from a speed sensor 59 through the invertor 36 as shown in FIG. 3. And, whereas in the foregoing description the determination of whether or not to disconnect the main relays Ry1, Ry2 was made on the basis of the induced voltage from the drive motor 11, there is no limitation to this, and alternatively the determination of whether or not to disconnect the main relays Ry1, Ry2 may be made on the basis of the induced voltage from the generator 21 functioning as an electric motor. For example, by the connecting states of the main relays Ry1, Ry2 being maintained when the generator 21 is being driven at a high speed, it is possible to protect the invertor 35 and the high-voltage auxiliaries 58.

The foregoing is control of relays of a drive motor in a hybrid car. In another series case besides this, when a generator/motor is being driven by an engine as a motive power source, whereas in a normal vehicle when an ignition switch is turned OFF engine fuel, ignition and generator/motor commands are stopped along with the switch being turned OFF, by engine control being stopped and the relays being disconnected after the generator/motor revolution number has fallen below a predetermined value in addition to the control of the present application, it is possible to protect the relays of the generator/motor.

The present invention is not limited to the preferred embodiment described above, and various changes can be made without deviating from the scope of the invention. For example, although the electric vehicle shown in the drawings is a hybrid car, there is no limitation to this, and the invention can alternatively be applied to an electric car having only an electric motor as a motive power source. And although the hybrid car shown in the drawings is a front-wheel-drive hybrid car, the invention may alternatively be applied to a rear-wheel-drive or four-wheel-drive hybrid car. Also, the hybrid car does not have to be a series/parallel type, and alternatively the invention may be applied to a series-only or parallel-only type hybrid car.

What is claimed is:

1. A control apparatus of an electric vehicle having an electric motor for driving driven wheels and a battery for supplying current to the electric motor, the apparatus comprising:
   a relay provided between the electric motor and the battery and switchable between a connecting state in which it supplies current to the electric motor and a disconnecting state in which it cuts of the supply of current to the electric motor;
   relay control means for switching the relay between the connecting state and the disconnecting state by outputting a control signal to the relay; and
   current detecting means for detecting an output current of the battery,
   wherein the relay control means switches the relay to the disconnecting state when there is a vehicle stop request and the output current of the battery is below a predetermined value.

2. A control apparatus of an electric vehicle according to claim 1, further comprising
   a switch turned on and off by a driver,
   wherein the vehicle stop request is determined according to the switch operated by the driver.

3. A control apparatus of an electric vehicle according to claim 1,
   wherein the relay control means keeps the relay in a connecting state when there is the vehicle stop request and the output current is above the predetermined value.

4. A control apparatus of an electric vehicle having an electric motor for driving driven wheels and a battery for supplying current to the electric motor, the apparatus comprising:
   a relay provided between the electric motor and the battery and switchable between a connecting state in which it supplies current to the electric motor and a disconnecting state in which it cuts of the supply of current to the electric motor;
   relay control means for switching the relay between the connecting state and the disconnecting state by outputting a control signal to the relay; and
   electromotive force detecting means for detecting an induced electromotive force from the electric motor,
   wherein the relay control means switches the relay to the disconnecting state when there is a vehicle stop request and the induced electromotive force from the electric motor is below a predetermined value.

5. A control apparatus of an electric vehicle according to claim 4, wherein the electromotive force detecting means detects the induced electromotive force on the basis of a motor revolution number or a vehicle speed.

6. A control apparatus of an electric vehicle according to claim 4, further comprising
   a drive circuit provided between the electric motor and the relay for generating a drive current of the electric motor.

7. A control apparatus of an electric vehicle according to claim 5, further comprising
   a drive circuit provided between the electric motor and the relay for generating a drive current of the electric motor.

8. A control apparatus of an electric vehicle according to claim 4, further comprising
   a switch turned on and off by a driver,
   wherein the vehicle stop request is determined according to the switch operated by the driver.

9. A control apparatus of an electric vehicle according to claim 4,
   wherein the relay control means keep the relay in connecting states when there is the vehicle stop request and the induced electromotive force from the electric motor is above the predetermined value.

10. A control apparatus of an electric vehicle according to claim 9, wherein the electromotive force detecting means detects the induced electromotive force on the basis of a motor revolution number or a vehicle speed.

* * * * *